700 MAGNIFICATION OF PARTICLE

3000 MAGNIFICATION OF SAME PARTICLE AS SHOWN IN FIGURE 1

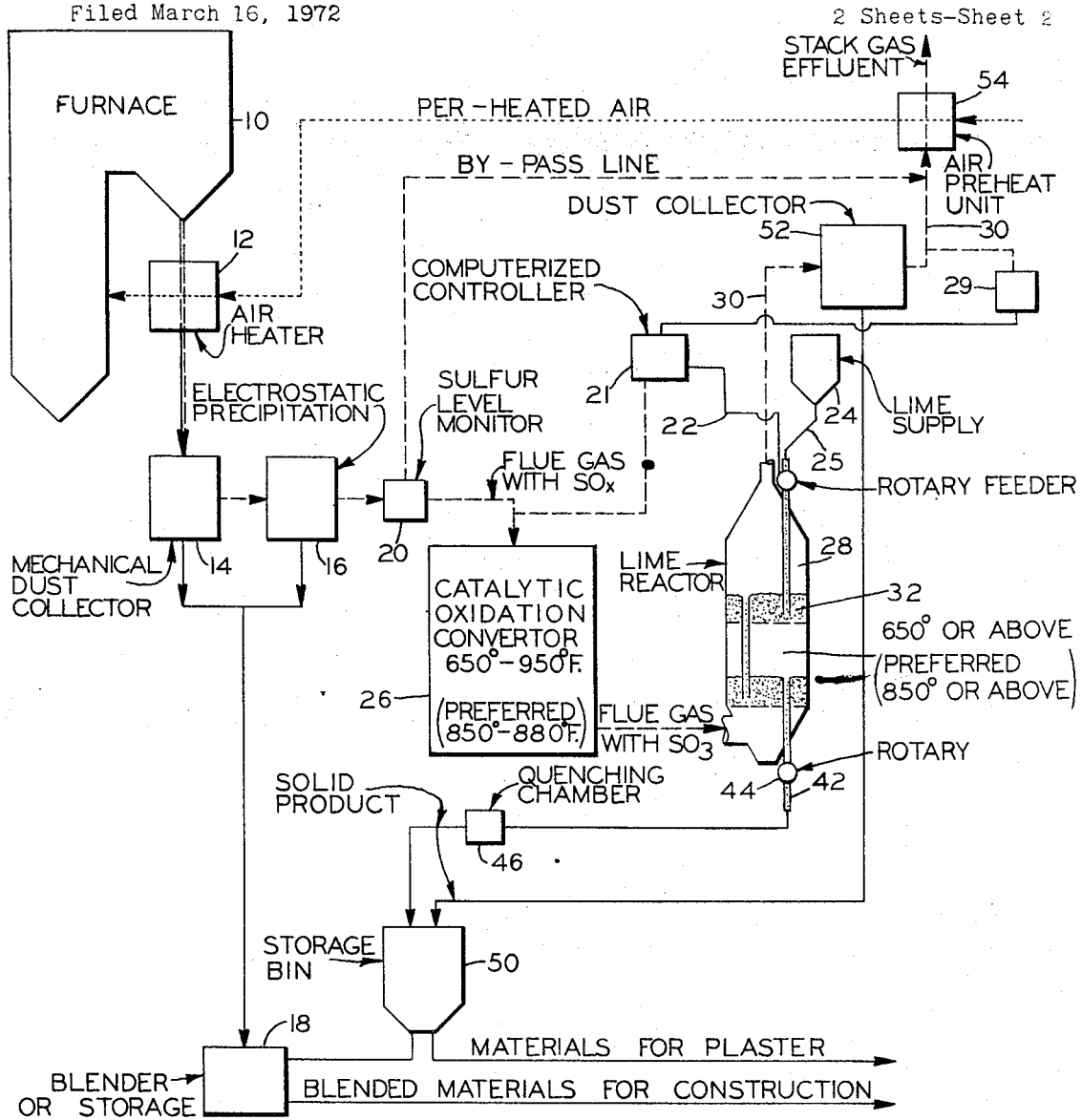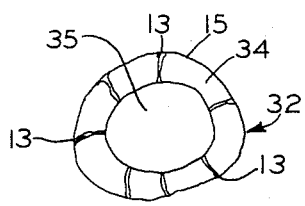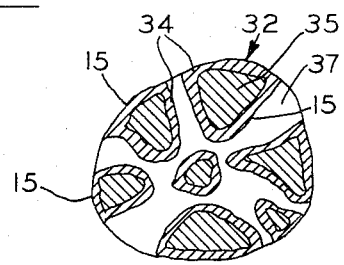

United States Patent Office 3,781,408
Patented Dec. 25, 1973

3,781,408
AIR POLLUTION CONTROL
Ping-Wha Lin, 506 S. Darling, Angola, Ind. 46703
Continuation-in-part of abandoned application Ser. No. 36,861, May 13, 1970. This application Mar. 16, 1972, Ser. No. 235,343
Int. Cl. B01j 9/04, 9/08; C01l 17/00
U.S. Cl. 423—244                    10 Claims

ABSTRACT OF THE DISCLOSURE

Combustion gasses from fuel-burning furnaces are treated to separate solid particles such as fly ash and to oxidize the sulfur dioxide gas ($SO_2$) contained therein to sulfur trioxide ($SO_3$). The $SO_3$ is reacted with excess lime (CaO) to form calcium sulfate ($CaSO_4$). The $CaSO_4$, unspent lime particles, some of which have cracked outer shells of $CaSO_4$, and collected fly ash are packaged dry and used in appropriately blended form together with cement and sand, gravel, or rock to form construction materials, the average percentage of $CaSO_4$ therein being regulated to control the setting time of the cement. The proportion of the excess lime is automatically regulated by process-control devices which continuously monitor and control the reaction applying the parameters of fuel composition, and sulfur oxide level in the combustion gasses.

RELATED APPLICATION

This application is a continuation-in-part of copending U.S. application Ser. No. 36,861 invented by Ping-Wha-Lin, filed May 13, 1970 and now abandoned.

BACKGROUND OF THE INVENTION

The invention relates to air pollution control, and more particularly to pollution control of effluent gasses that contain fly ash and sulfur-bearing gasses.

Air pollution is a very serious and urgent international problem. The sources of air pollution are the products of combustion and are almost always numerous and widespread. Alone, the United States is currently pouring pollutants into the atmosphere at the staggering rate of 160 million tons a year.

Much of the air pollutants are in the form of fly ash and sulfur-bearing gasses discharged by coal-burning electrical power generating plants or other industries, or even by oil-consuming heaters in private homes or other buildings. These pollutants actually cause untold millions or billions of dollars of annual damage by corroding buildings and structures, and also cause innumerable cases of human suffering from various respiratory diseases plus the above-mentioned global effects. Yet, under any foreseeable circumstances, we will have to burn more and more fuel to meet the demand of rapidly growing population requiring for each person ever-more heating comfort and electrical power. And the fuel we shall use will not contain much less, but likely contain more sulfur and fly ash.

This invention discloses methods and equipment designed not only to remove these pollutants but to convert them into useful and salable by-products, such as construction materials.

While not limited thereto, the invention is herein described as applied to combustion gasses discharged into the air from a power plant and containing fly ash and sulfur-bearing gasses.

An important object of the invention is to control the pollution of air from effluent gasses containing sulfur oxide gas and solid particles such as fly ash;

Another object is to remove fly ash and sulfur oxide bearing gasses from combustion gasses in an economical manner;

Yet another object of this invention is to collect air pollutants and convert them into useful by-product forms;

A further object is to use the collected pollutants for special treatment and economical manufacture of cinder block or other construction materials;

Another object is to provide means and methods for controlling the composition of the combustion gasses through automatic process control of the pollutants-treating processes, based on monitored data relating to the type and amount of pollutants in the combustion gasses, and the efficiency of the various treating processes, with due regard to the fuel quality and requirement of the manufactured construction materials.

A further object is to produce from the air pollutants useful construction materials of novel characteristics.

An overall object of the invention is to provide a continuous process for effectively removing sulfur dioxide as a pollutant from combustion gasses and to do so by means of substantially converting the sulfur dioxide and then exposing such sulfur trioxide to a fluidized bed of calcium oxide under such reaction conditions that virtually all of the sulfur trioxide is reacted to form calcium sulfate and is hence removed from the outflow of combustion product gasses.

Further objects and advantages of my invention will appear as the specification proceeds.

SUMMARY OF THE INVENTION

My invention discloses methods and equipments for removing $SO_2$, $SO_3$ and fly ash in combustion gasses discharged as air pollutants from fossil fuel-burning, heating furnaces. The removal is accomplished by means of dust collectors and catalytic oxidation of $SO_2$ to $SO_3$ followed by controlled reaction of $SO_3$ with excess lime to form $CaSO_4$. The unspent lime, $CaSO_4$ and collected fly ash are used together with cement for the manufacture of construction materials, the percentage of $CaSO_4$ being carefully regulated to control the setting time of the cement. Preferably, the proportion of the excess lime is automatically regulated by process control devices designed with due regard to fuel quality and requirement of the construction materials and operating according to the monitored sulfur-level of the combustion gasses.

BRIEF DESCRIPTION OF THE DRAWINGS

The preferred form of my invention is illustrated in the accompanying drawings, in which:

FIG. 3 shows a flow diagram of the pollution control process and monitoring equipments used therefor; and FIGS. 4 and 5 are diagrammatic cross-sectional views of unspent lime particles having $CaSO_4$ surface coatings.

DESCRIPTION OF THE PREFERRED EMBODIMENTS

Figure 1:
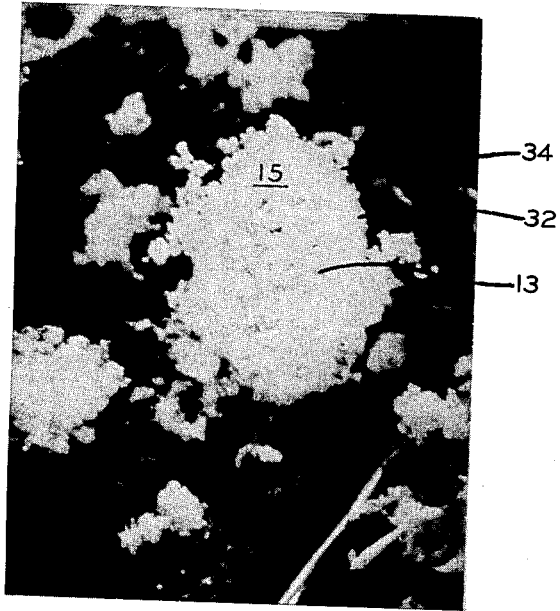
FIG. 1 is a photomicrograph of 700× magnification of a calcium oxide particle coated with calcium sulfate and produced as by-product of the present invention and illustrating the unique cracked configuration in the outer layer of calcium sulfate.

In the flow diagram of FIG. 3 is shown a furnace 10 in which fossil fuel containing sulfur and inert residues is burned with air, which is preheated for better heating efficiency. The combustion gasses from the furnace 10 contain $SO_2$, $SO_3$, and suspended solid particles consisting of noncombustible residue and partially burned fuel.

According to J. W. Mellow (in A Comprehensive Treatise on Inorganic and Theoretical Chemistry, vol. X, Wiley, N.Y., 1961, pp. 90 to 91), sulfur burns in air to form mostly $SO_2$, but with a few percent by weight of $SO_3$ in the oxidation products. When the oxidation products are drawn over ferric oxide, such as is usually present in coal, the quantity of $SO_3$ can be increased to 17%. If the air contains moisture, a little sulfuric acid ($H_2SO_4$) is also formed. These two compounds are desirable to the practice of my invention, as will be shown.

The combustion gasses are passed through an air preheater 12 and are regulated to an elevated temperature, preferably to about 900° F. before being passed through a mechanical dust collector 14 and an electrostatic precipitator 16 system for the separation of solid particles in the form of fly ash. The dust collector system comprises a mechanical dust collector 14 to remove large fly ash particles and a high temperature electrostatic precipitator 16 to separate the finer particles in the combustion gasses. Mechanical dust collectors usually separate entrained particles in gasses by centrifugal force. Electrostatic precipitators may be used for the removal of practically any material suspended in gasses by electrically attracting these particles.

The dust collector system should have nearly 100% efficiency in solid-particle removal, particularly with regard to those particles which may posion catalysts in the catalytic oxidation convertor to be described. Separated fly ash particles are collected and sent to a blender or storage bin 18.

The flue gas, i.e., combustion gasses cleaned of the suspended particles, then passes through a sulfur-level monitor 20, which determines the level of sulfur concentration in the flue gas, and has a computerized controller 21 and a servo connection 22 to a lime supply 24 connected by supply line 25 to lime reactor 28. The flue gas contains sulfur oxides $SO_x$ mainly as $SO_2$ and $SO_3$ and is then passed through a catalytic oxidation convertor 26. A typical catalytic convertor contains vanadium catalyst having a very large surface to volume ratio and operated at elevated temperatures 650° F.–950° F., preferably between 850° F. to 880° F., to oxidize $SO_2$ into $SO_3$ according to the following reaction:

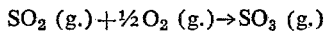

$$SO_2 (g.) + \tfrac{1}{2} O_2 (g.) \rightarrow SO_3 (g.)$$

It is evident that increasing the pressure of the convertor, which is preferable in some cases, shifts the chemical equilibrium toward the right thereby enhancing the efficiency of the desired conversion of $SO_2$ to $SO_3$. However, according to R. F. Bovier (in Proceedings of the American Power Conference, vol. 26, 1964), even at one atmospheric pressure, the conversion efficiency is typically over 90%.

The flue gas coming into the lime reactor 28 generally contains around 9% of moisture. The following reactions take place at above 880° F. in the reactor:

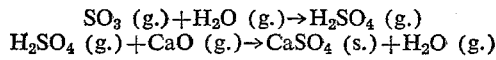

$$SO_3 (g.) + H_2O (g.) \rightarrow H_2SO_4 (g.)$$
$$H_2SO_4 (g.) + CaO (g.) \rightarrow CaSO_4 (s.) + H_2O (g.)$$

CaO and $CaSO_4$ can absorb a large quantity of water at room temperature. At high temperatures, however, these compounds absorb very little or no water. Hence, these compounds coming out of the lime reactor 28 can be moisture-free, and can even remain so if immediately packaged in dry atmosphere.

The $SO_3$ may also combine with CaO directly to form $CaSO_4'$

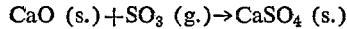

$$CaO (s.) + SO_3 (g.) \rightarrow CaSO_4 (s.)$$

For reasons of increased agitation, better heat transfer, high reaction efficiency, small floor space, economy installation and operation, and other factors, the lime reactor 28 or reacting system should be continuously operated and comprises one or more counter-current, multi-stage, fluidized CaO reactors.

Since the $SO_3$ concentration in the stack gas is quite low, the monitor 20 is responsive to the $SO_x$ content which is essentially $SO_2$. While the feed rate of lime is not high, its feed rate is correlated to the $SO_2$ content by means of the computerized controller 21 which, by means of servo line 22 regulates the correct feed rate of lime from lime supply 24 through a rotary feeder in line 25 to lime reactor 28. Under usual reaction conditions approximately 35 mg. of pulverized lime is sufficient for each liter of flue gas for total sulfur oxide gas removal.

The feed rate of flue gas as well as the sulfur oxide gas content is variable but at all times the lime supply is correlated thereto. The controller is programmed with due regard to the fuel quality and requirements of the manufactured construction materials and by the servo operation to effect a near total removal of the $SO_3$ content of the flue gasses. A monitor 29 is located in the flue gas outlet line 30 from the line reactor 28 so that if for any reason the equipment is not performing satisfactorily the operation will signal a malfunctioning to indicate the need for adjustment repair or shut down.

The exit solid stream from the lime reactor 28 consists of particles of different degrees of conversion from CaO to $CaSO_4$. The average conversion of this stream depends mainly on two factors:

(A) The rate of reaction of lime particles in the reactor environment, and (B) The residence time distribution of the solids in the lime reactor.

The chemical reaction between $SO_3$ and CaO is highly exothermic. But since the concentration of $SO_3$ in the flue gas is low (i.e., 2000 p.p.m. by volume), the heat generated from the lime reaction can be made to just meet the heating requirement for the cold, freshly-added lime. Therefore, it is expected that the reactor 28 will be operated at the same temperature as the incoming flue gas, i.e. above 650° F. and preferably above 850° F. The cold lime may be efficiently heated by spirallying down inside the lime reactor to extract some heat from the hot gasses discharged from the reactor.

The particle size of CaO is important in the fluidization process, as it affects solids flow characteristics, bed densities, losses of solids, and equipment erosion. According to Othmer (see, e.g., Fluidization, Reinhold Publishing Corporation, N.Y., 1956), a broad range of particle sizes gives better fluidization than a narrow range; and fine, pulverized materials are better than coarse. Commercially available, ground quicklime, typically about 100% passing No. 8 sieve and 2 to 4% passing No. 100 sieve, can be used in the fluidized lime reactor, pulverized lime 100% passing No. 20 sieve, also 85%–95% passing 100 sieve is available and is satisfactory. The governing factors, in the fluidized lime reactor design are: densities of solids, particle sizes, concentration of $SO_3$ in the stack gas, and flow rate of stack gas. Knowing all these factors, skilled chemical engineers can select the reactor to meet individual design requirements.

Figure 2:
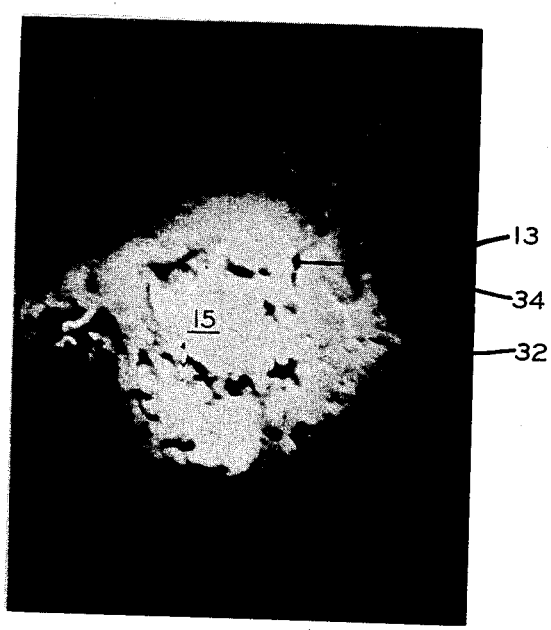
FIG. 2 is a photomicrograph of the same particle as FIG. 1 but at 3,000× magnification and showing even more clearly details of the core, coating and cracks in the coating.

The CaO size distribution is particularly important in the practice of my invention for another reason. CaO is fed purposely in excess of the amount required for complete conversion of $SO_x$ to $CaSO_4$. Hence, some CaO particles are barely, or even not at all, changed at the surface or interior. Other extremely fine CaO particles 32 (FIGS. 1, 2, 4, 5) may, however, be completely converted to $CaSO_4$. But most CaO particles are only partially converted on their surfaces, giving cracked 13 coatings 15 of $CaSO_4$ 34 on cores of unspent CaO 35 as shown in FIG. 4. CaO may be porous, like a sponge (FIG. 5). In this case, the surface of the pores 37 are also converted into $CaSO_4$ (FIG. 5). These new structures of unspent lime achieve novel results that will be discussed.

The surface layers of $CaSO_4$ are only of the order of 15 microns ($10^{-4}$ cm.) in thickness. This is because the residence time $t_r$ af the lime particles in the lime reactor is estimated to be in the range of 10 to 100 minutes, depending on the particle size distribution, gas flow rate, fluidized reactor design, and other variables. The diffusion coefficient of $SO_3$ through $CaSO_4$ layers, D, to reach and react with the inner, unspent CaO can be considered to be about $10^{-9}$ cm.$^2$/sec. at a temperature above 850° F. The penetration depth, or surface $CaSO_4$ layer thickness, is then about $\sqrt{Dt_r}$ or in the range of 7.8 to 23.2 microns. These $CaSO_4$ layers contain cracks 13 because of the sudden cooling in quenching chamber 46 from the preferred temperature above 850° F. to ambient temperature.

The reacted lime particles are discharged from lime reactor 28 through line 42 having a rotary feeder 44 and into a quenching chamber 46. When the hot $CaSO_4$ coated lime particles are cooled from a preferred temperature above 850° F. in quenching chamber to ambient temperature the sudden thermal shock gives rise to the before-described cracks 13 which have an important functional aspect. The cracks in the $CaSO_4$ coating cover, do not suppress the water reaction of the CaO particles used as a construction material and is entirely and definably new. Such a unique, cracked structure has never been used in actual practice, nor even suggested by any prior practices. The core 35 is substantially pure CaO and the particle size of cracked, calcium sulfate coated particles is as hereinbefore defined. Hence, the covered, unspent CaO still reacts readily with the fly ash to be discussed later.

The solid product from fluidized lime reactor 28 will contain well-blended, unspent lime and $CaSO_4$ and is collected in storage bin 50. Each particle of the solid product has only CaO in the core and pure $CaSO_4$ cracked coating. Since the $CaSO_4$ coatings are formed on CaO particles in the reactor which has a very narrow temperature range, i.e. 850° F. to 880° F. The reacting gasses in the reactor contain over 90 percent $SO_3$ if the convertor is operated in optimum temperature of 850° F. to 880° F. Hence the reaction is well controlled, and the reaction product is simple and pure. The product contains CaO and $CaSO_4$ and each compound coacts with the other and serves its unique and useful function as construction materials. It is understood that the feed rate may affect the percentage of unspent lime in the outflow of solids. The properties of the solid can be modified by altering the unspent lime percentage. The solid product can be used:

(A) For making flooring plaster: It is known that large pure $CaSO_4$ particles set very very slowly, usually in a number of days or weeks. In fact, hard-burned $CaSO_4$ can never set by itself (J. W. Mellor, A Comprehensive Treatise of Inorganic and Theoretical Chemistry, vol. 3, pp. 774–775, Longmans). When the solid product is mixed with water, the lime in the core areas will leach out and serve as an accelerator in $CaSO_4$ hardening. The initial set takes place in less than 24 hours. In making flooring plaster by hydration, the $CaSO_4$ to CaO ratio should generally be about 1:3, though in cases this same ratio may be reduced to 1:4 or increased to 14:1 in the extreme. If when the solid product is further calcined to 1,000° C. for one hour, the unspent lime and $CaSO_4$ become sintered and form a very hard flooring plaster upon hydration.

(B) For reclaiming fly ash: The solid materials collected from the dust collector 14 and precipitator 16 system and those from the lime reactor 42 are then blended together in blender 18. The blending ratio may change the unspent lime concentration and the percentage of $SO_3$ in the mixture. The properties of the mixture can be modified by altering the blending ratio in order to make the mixture particularly suitable for a specific application. The blended mixture of $CaSO_4$, unspent lime, and fly ash may be sold as such, for uses such as in construction materials, soil conditioners, liquid waste treatments, and the like. However, in many cases, cement, clinker, clay, rocks (in the form of sand, gravel, or chips and fragments) may be added to the blended mixture for the manufacture of brick, cinder blocks or other concrete structure members. In concrete manufacture, the gypsum serves the purpose of regulating the setting time of cement. If $CaSO_4$ concentration is too high, there is the danger of gypsum expansion during hardening because of a quick reaction of $CaSO_4$ with tricalcium aluminate (in the fly ash) to form a low-density, large-volume compound called calcium sulphoaluminate. Hence, the maximum allowable gypsum concentration has generally been specified at about 5% by weight of cement. If anhydrous sulfate is used, it sets with very little expansion.

Fly ash with its silica and alumina readily reacts with lime in the presence of water to form a compound of cementitious value (Pozzolanic activity). If the lime particles are covered on their surfaces with thin (15-micron) cracked $CaSO_4$ layers, such reactions will quickly expose the normally unreachable inside of $CaSO_4$ layers for their actions in the blended mixture. Thus, the $CaSO_4$ is greatly and rapidly activated in its entirety, permitting minimum concentration of $CaSO_4$ to be used in the mixture for given results in cement setting control; or resulting in complete, effective usage of $CaSO_4$ in the final product.

In ordinary concrete mixtures, the $CaSO_4$ (gypsum) is in the form of large particles, up to several millimeters in diameter. The regulating effect of these $CaSO_4$ particles is slow and incomplete, being governed by solid-state diffusion. Further, the gypsum expansion in this particulate $CaSO_4$ introduces high tensile stress concentration and causes cracks. Hence, the range of $CaSO_4$ concentration is often very narrow and critical, i.e., from 4 to 5% by weight, of cement produced. On the other hand, the $CaSO_4$ from my invention has the new, film (about 15 microns thick) structure covering the unspent lime particles. The surface-to-volume ratio in this $CaSO_4$ is very high, being increased over the conventional particulate $CaSO_4$ by a factor estimated to exceed 10. The $CaSO_4$ reaction is now fast and complete, thereby allowing much reduced $CaSO_4$ concentration in the mixture. At the same time, even much higher $CaSO_4$ concentration is tolerable because the high stress build-up is not present. Partially because of the presence of cracks in view of the thinness of and presence of cracks in the $CaSO_4$ surface layer, the range of $CaSO_4$ in my new concrete mixture can be widened (safely to 2–8% by weight of $CaSO_4$-fly ash mixture) and is non-critical.

(C) For making cement: A carefully blended mixture of the solid product, cake, shale, and pyrites is charged to a kiln which is fired with pulverized coal and the end product is cement and exit gasses containing high percent of $SO_2$.

When the solid product, the particles with lime in core area surrounded by cracked $CaSO_4$, is heated to above 2,000° F. but below 2,550° F. in a rotating furnace, $SO_2$ and $SO_3$ are released, leaving CaO behind:

$$CaSO_4 \rightleftarrows CaO + SO_3 \text{ (in oxidizing atmosphere)}$$

$$2CaSO_4 \rightleftarrows 2CaO + 2SO_2 + O_2$$

Additions such as iron pyrites, iron oxide and lead oxide increase the speed of decomposition and lower the temperature of decomposition. The exit gas from the furnace, rich in $SO_2$ and $SO_3$ can be used for $H_2SO_4$ or ammonium sulphate production. The regenerated CaO together with the unspent lime from the solid product are recycled to the lime reactor for further $SO_3$ removal. By recycling the CaO, materials handling problem will be greatly minimized.

Dust particles in the gas discharged from the lime reactor are also separated by an electrostatic precipitator 52 or other means. The effluent gas will now be free of $SO_2$, $SO_3$ and dust. To conserve energy, the same gas is introduced into an air preheater 54 where the temperature drops to about 250° F. before discharging as stack gas effluent. Since the effluent gas still has relatively high temperatures, moisture contained therein will not condense in the stack, and its dispersion in the atmosphere is swift.

I have thus solved a problem of air pollution, and satisfied a long-standing need for a commercially acceptable system for air pollutants disposal. However, the process is not to be construed as limited to the particular forms described herein, since these are to be regarded as illustrative rather than restrictive. For example, engineers can readily use the principle of this invention to design air pollution control equipments for other polluting industries such as oil refining, coal coking, metal smelting, ore roasting, and waste incinerating. Further chemicals other than CaO may be used to stabilize at least one of the $SO_2$ and $SO_3$ gasses to form stable, non-gaseous chemical reaction products which can be easily disposed. For example, magnesia, MgO, closely resembles CaO, is almost invariably present in commercial lime. It reacts with $SO_2$, $SO_3$ to form $MgSO_4$ just like CaO, but it does not combine with silica or alumina to form compounds of cementitious value as construction materials. Since the slacking of magnesia is accompanied by an increase in volume and cracking of the hardened concrete, the allowable magnesia contents in cement is limited to 5%. In addition, fixed-bed lime reactors can be substituted and designed to replace the fluidized bed reactor hereinbefore described.

Although the present invention has been illustrated and described in connection with a few selected example embodiments, it will be understood that they are illustrative of the invention and are by no means restrictive thereof. It is reasonable to expect that those skilled in this art can make numerous revisions and adaptations of the invention and it is intended that such revisions and adaptations will be included within the scope of the following claims as equivalents of the invention.

What I claim is:

1. A process for continuously decontaminating flue gas derived generally from burning fossil fuels, comprising the steps of: continuously passing a flow of such gasses through a catalytic reactor to effect substantially complete oxidation conversion of the sulfur dioxide content of the gasses to sulfur trioxide, continuously bringing the sulfur trioxide containing flue gasses through a fluidized bed of excess calcium oxide at a temperature above 650° F., such bed being in the form of calcium oxide particles passing through a No. 8 sieve and which are confined within a reaction vessel and including an inlet and an outlet, commingling all of the gaseous flow and solid particulate calcium oxide so that substantially all of the sulfur trioxide content is reacted on surfaces of the calcium oxide to form surrounding layers of calcium sulfate as shells on the calcium oxide particles, monitoring the sulfur oxide content of the gasses to determine the amount of calcium oxide content of said fluidized bed, continuously removing the reaction product of the sulfur trioxide and calcium oxide, venting the substantially sulfur-trioxide-free gaseous flow of flue gasses from the reaction vessel, after exposure to the finely divided particulate calcium oxide material, and continuously replenishing the fluidized bed with additional unreacted particulate calcium oxide material.

2. The process in accordance with claim 1 wherein the reaction between the sulfur trioxide and calcium oxide occurs within the reaction vessel at a temperature range of 650° F.–950° F.

3. The process in accordance with claim 1 wherein the reaction between the sulfur trioxide and calcium oxide occurs within the reaction vessel at a temperature above 650° F. and, preferably above 850° F.

4. The process in accordance with claim 1 including the steps of continuously monitoring the sulfur oxide content of the gaseous flow prior to entry into said reaction vessel and correlating the amount of calcium oxide injected into said vessel with the sulfur oxide content, and continuously removing the solid reaction product of the sulfur oxide gas and calcium oxide.

5. The process in accordance with claim 1 wherein the flow of sulfur oxide gas is passed continuously through the fluidized bed of calcium oxide and the unspent, and reacted calcium oxide particles are removed and blended together.

6. The process in accordance with claim 1, including the step of quenching the reacted calcium oxide particles after they are removed from the reaction vessel.

7. The process in accordance with claim 6 including the step of continuously monitoring the flow of gasses from such vessel to provide a continuous monitoring of the effluent gasses vented to atmosphere.

8. The process in accordance with claim 6 wherein the particle size of calcium oxide is proportional to provide a surface/volume ratio of such size as to completely react all of the sulfur oxide gas in said reaction vessel.

9. The process in accordance with claim 6 wherein the calcium oxide is provided in excess quantity within said vessel and the spent and unspent calcium oxide particles are blended together.

10. The process in accordance with claim 1 wherein the reaction between the sulfur trioxide and calcium oxide occurs within the reaction vessel at a temperature range of 850° F.–880° F.

References Cited
UNITED STATES PATENTS

| | | | |
|---|---|---|---|
| 2,718,453 | 9/1955 | Beckman | 423—555 |
| 3,508,868 | 4/1970 | Kiyoura | 23—119 |
| 3,411,865 | 11/1968 | Pijpers et al. | 23—2 |
| 2,021,936 | 11/1935 | Johnstone | 423—242 |
| 3,632,306 | 1/1972 | Villiers-Fisher et al. | 423—242 |

FOREIGN PATENTS

| | | | |
|---|---|---|---|
| 435,560 | 9/1935 | Great Britain | 23—2 S |
| 21,667 | 2/1968 | Japan | 106—103 |

OSCAR R. VERTIZ, Primary Examiner

G. A. HELLER, Assistant Examiner

U.S. Cl. X.R.

423—555; 106—109, 306